No. 677,782. Patented July 2, 1901.
J. LANZ.
WAR GAME.
(Application filed Oct. 19, 1900.)
(No Model.)
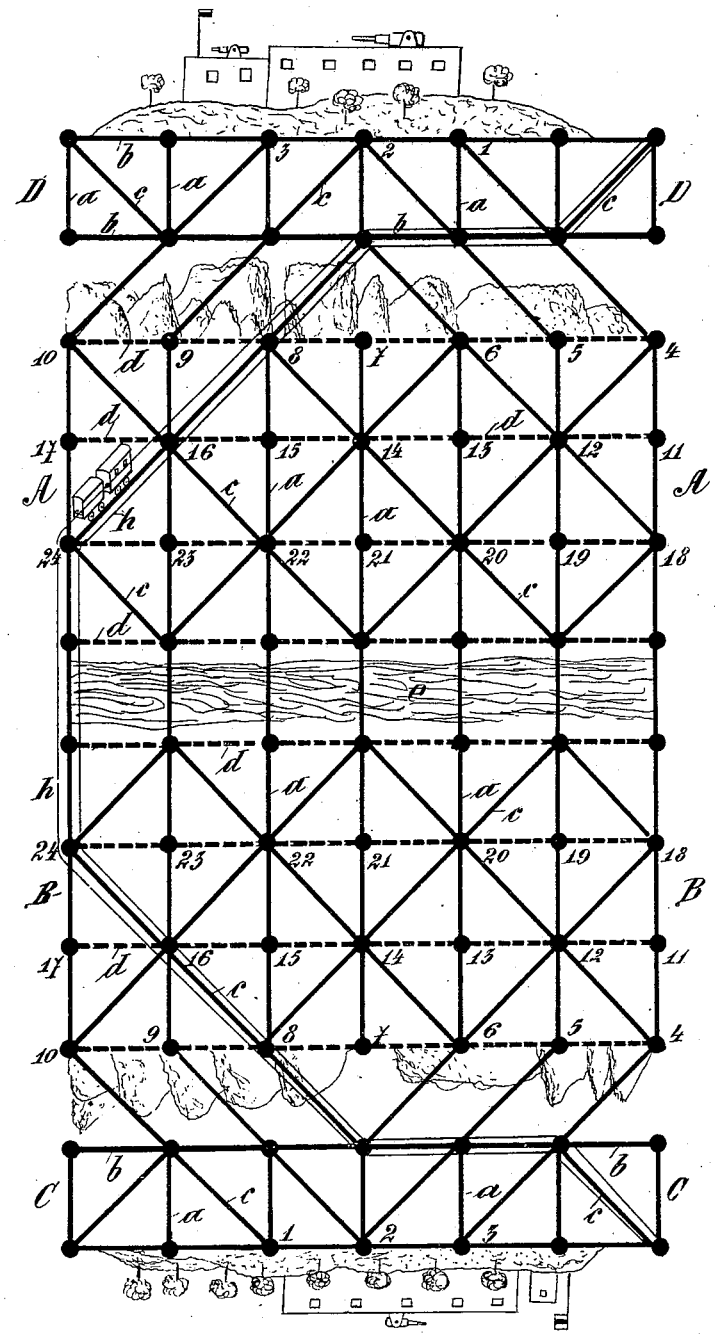

UNITED STATES PATENT OFFICE.

JÖRG LANZ, OF VIENNA, AUSTRIA-HUNGARY.

WAR GAME.

SPECIFICATION forming part of Letters Patent No. 677,782, dated July 2, 1901.

Application filed October 19, 1900. Serial No. 33,632. (No model.)

*To all whom it may concern:*

Be it known that I, JÖRG LANZ, doctor of philosophy, a subject of the Emperor of Austria-Hungary, residing at Schonburgstrasse 32, Vienna, Austria-Hungary, have invented a new or Improved War Game, of which the following is a specification.

The present invention relates to a game-board upon which a novel war game can be played, the arrangement of the lines upon which the pieces move being such that the said lines indicate by interruptions or color the nature of the country represented upon the board, and thus limit the movement of the pieces over difficult country, while a railway-line is indicated on the board, along which the pieces can move irrespective of the nature of the country. The board is divided into two equal parts, at the end of each of which a space is provided the occupation of which to a given extent by pieces belonging to the opponent indicates the victory of the latter.

The annexed drawing represents a diagram of the board, on which are drawn a series of black longitudinal lines *a*, similar diagonal lines *c* crossing them, and two similar cross-lines *b* at each end, and red or otherwise colored cross-lines *d* cross the aforesaid longitudinal lines on the central part of the board. These form eighty-four numbered points of intersection upon which places for the pieces are marked. Under this system of lines a country is represented in relief or otherwise in such a manner as to have the following relation to the said system of lines: Across the middle a river *e* is represented, by which the diagonal lines are interrupted, the board thus being divided into an upper part or field A and a lower part or field B, each of which belongs to one of the players. Across each part at *f* and *g*, respectively, a line of mountains are represented by which the longitudinal lines are interrupted and which thus divide off the end parts or fields C and D, which represent the fortresses or camps to be captured. A railway-line *h* (indicated by lines) passes over the entire length of the board and forming a continuous line over which the pieces are moved from one end of the board to the other. The parts or fields A, B, C, and D can also be arranged differently.

Pieces are used with the board, representing infantry, cavalry, and artillery. With the arrangement described above each player is provided with twenty-four pieces—*i. e.*, sixteen infantrymen, six cavalrymen, and two guns.

A method of playing is as follows: Each player arranges his pieces upon the places marked "1" to "24" on his part of the board. The respective arrangement of the various arms represented is left to him. It is decided by lot which player shall open the game. After the first move the moves are alternate. The moves can only take place on the black lines, the infantrymen and the guns moving from one point of intersection to the next, while the cavalrymen can move from one point to the next but one. Along the railway-line each piece can move to the second, third, or fourth point. Only uncovered pieces can be taken—that is, such pieces the next point behind which on the opponent's line of attack is unoccupied. Taking a piece counts as one move, and only one piece may be taken at a time. Infantry and cavalry pieces can take any uncovered piece both over black and colored lines, while artillery pieces can only take pieces over black lines, but can take several uncovered pieces even if the same are farther away than the next point; but the artillery piece must then return to the point it occupied. A piece which omits to take another when the opportunity was offered is confiscated by the opponent. The winner is the player who has either first occupied the points 1, 2, and 3 in the opponent's end part or field C or D or who has taken all the opponent's pieces except two.

While the game has been shown and described as applicable to "land" forces, it is obvious that by changing the character of the pieces and the pictorial background the same can be used for "sea" forces, in which case battle-ships, &c., would take the value and moves of the infantry, while the artillery would be represented by torpedo-boats.

What I claim is—

A game-board having four divisions of squares of equal size arranged in longitudinal and cross alinement, the two center divisions being connected by longitudinal lines only, the corners of said squares forming points to receive the game-pieces, diagonal lines connecting and passing over the squares on opposite sides of the longitudinal center of the board, the diagonal lines on the central divisions crossing each other at right angles, and a pictorial representation of a "track" extending from one corner of the board to the opposing corner at the opposite end of the board and leading from one of the end divisions to the other end division and traversing the central divisions, following certain of the diagonal, cross and longitudinal lines of the divisions, substantially as described.

In witness whereof I have hereunto set my hand in the presence of two witnesses.

JÖRG LANZ.

Witnesses:
 HANS PAPPENTICH,
 ALVESTO S. HOGUE.